US011968764B2

(12) United States Patent
Torii

(10) Patent No.: US 11,968,764 B2
(45) Date of Patent: Apr. 23, 2024

(54) LIGHT AND SYSTEM

(71) Applicant: BOXYZ, INC., Tokyo (JP)

(72) Inventor: Akatsuki Torii, Tokyo (JP)

(73) Assignee: BOXYZ, INC, Tokyo (JP)

(*) Notice: Subject to any disclaimer, the term of this patent is extended or adjusted under 35 U.S.C. 154(b) by 0 days.

(21) Appl. No.: 18/261,861

(22) PCT Filed: Jan. 20, 2021

(86) PCT No.: PCT/JP2021/001921
§ 371 (c)(1),
(2) Date: Jul. 18, 2023

(87) PCT Pub. No.: WO2022/157868
PCT Pub. Date: Jul. 28, 2022

(65) Prior Publication Data
US 2024/0074020 A1 Feb. 29, 2024

(51) Int. Cl.
*F21K 9/238* (2016.01)
*F21V 23/00* (2015.01)
(Continued)

(52) U.S. Cl.
CPC ............. *H05B 47/19* (2020.01); *F21K 9/238* (2016.08); *F21V 23/005* (2013.01); *F21V 23/06* (2013.01);
(Continued)

(58) Field of Classification Search
CPC ....... H05B 47/19; F21K 9/238; F21V 23/005; F21V 23/06; F21V 29/83; F21Y 2105/18; F21Y 2115/10
See application file for complete search history.

(56) References Cited

U.S. PATENT DOCUMENTS 11,455,884 B2 * 9/2022 Bosua .................... H05B 47/19
2015/0070205 A1 * 3/2015 Chang .................. F21V 23/045 342/110
(Continued)

FOREIGN PATENT DOCUMENTS

CN 109084196 A * 12/2018 ............ F21K 9/232
JP 2010044950 A 2/2010
(Continued)

OTHER PUBLICATIONS

English translation of Sugihara, published Aug. 2018 (Year: 2018).*
(Continued)

*Primary Examiner* — Evan P Dzierzynski
(74) *Attorney, Agent, or Firm* — Parsons Behle & Latime

(57) ABSTRACT

A light includes a plurality of light-emitting elements; a first substrate having a first surface on which the light-emitting elements are arranged at predetermined intervals, a second surface, and an opening that connects the first surface and the second surface; a second substrate located facing the second surface of the first substrate and having a communication unit mounted thereon; and an antenna arranged on the second substrate, wherein in response to an on/off operation, the communication unit transmits information about the on/off operation to an external destination, and the antenna extends through the opening of the first substrate in a direction crossing the first surface of the first substrate.

20 Claims, 6 Drawing Sheets

(51) Int. Cl.

| | |
|---|---|
| ***F21V 23/06*** | (2006.01) |
| ***F21V 29/83*** | (2015.01) |
| ***H05B 47/19*** | (2020.01) |
| *F21Y 105/18* | (2016.01) |
| *F21Y 115/10* | (2016.01) |

(52) U.S. Cl.

CPC ........... *F21V 29/83* (2015.01); *F21Y 2105/18* (2016.08); *F21Y 2115/10* (2016.08)

(56) References Cited

U.S. PATENT DOCUMENTS

| | | | | |
|---|---|---|---|---|
| 2015/0327349 | A1 | 11/2015 | Lee et al. | |
| 2018/0249560 | A1 | 8/2018 | Ando et al. | |
| 2019/0041026 | A1* | 2/2019 | Stolte | F21V 3/02 |

FOREIGN PATENT DOCUMENTS

| | | | | |
|---|---|---|---|---|
| JP | 2010238572 | A | | 10/2010 |
| JP | 2012199259 | A | | 10/2012 |
| JP | 201369559 | A | | 4/2013 |
| JP | 2014099337 | A | | 5/2014 |
| JP | 2018133172 | A | * | 8/2018 |
| JP | 2018142399 | A | | 9/2018 |

OTHER PUBLICATIONS

English translation of Zhong CN-109084196-A, published Dec. 2018 (Year: 2018).*

Japan Patent Office; International Search Report and Written Opinion for Application No. PCT/JP2021/001921 dated Mar. 9, 2021.

Japan Patent Office; Office Action for Application No. 2022-576282 dated Dec. 1, 2023.

* cited by examiner

LIGHT AND SYSTEM

CROSS-REFERENCE TO RELATED APPLICATIONS

This application is the National Stage of International Application No. PCT/JP2021/001921 filed Jan. 20, 2021, the entire contents of which are hereby incorporated by reference in its entirety.

TECHNICAL FIELD

The present disclosure relates to a light using light-emitting elements.

BACKGROUND ART

For example, Patent Document 1 discloses a light-emitting diode (LED) lamp as a light using light-emitting elements. The LED lamp disclosed in Patent Document 1 uses LED elements as light-emitting elements and incorporates a human sensor that detects the presence of a person and performs lighting control for power saving.

PRIOR ART DOCUMENT

Patent Document

Patent Document 1: Japanese Unexamined Patent Publication No. 2014-99337

SUMMARY OF THE INVENTION

Problems to be Solved by the Invention

The technology disclosed in Patent Document 1 is implemented with, as the human sensor, a transmitter circuit that transmits electromagnetic waves with a frequency of 24 GHz, a receiver circuit that receives the reflected electromagnetic waves, and a transmitter circuit that transmits a Doppler signal in a frequency band corresponding to the moving speed of the human body as a detection signal. The human sensor detects the presence or absence of a person with the detection signal to control the turning on and off of the light; however, it does not provide information indicating that the operation of turning the light on or off has been performed. Therefore, it is not known from a remote location that the light has actually been turned on or off.

It is therefore an object of the present disclosure to provide a light that offers information about the operation of turning the light on/off.

Means for Solving the Problems

In order to achieve the object mentioned above, the present invention includes the following aspects:

(1) A light comprises: a plurality of light-emitting elements; a first substrate having a first surface on which the light-emitting elements are arranged at predetermined intervals, a second surface, and an opening that connects the first surface and the second surface; a second substrate located facing the second surface of the first substrate and having a communication unit mounted thereon; and an antenna arranged on the second substrate, wherein in response to an on/off operation, the communication unit transmits information about the on/off operation to an external destination, and the antenna extends through the opening of the first substrate in a direction crossing the first surface of the first substrate.

(2) A light comprises: a plurality of light-emitting elements; a first substrate having a first surface on which the light-emitting elements are arranged at predetermined intervals and a second surface opposite to the first surface; a second substrate located facing the second surface of the first substrate and having a communication unit mounted thereon; and an antenna arranged on the first surface of the first substrate, wherein in response to an on/off operation, the communication unit transmits information about the on/off operation to an external destination, and the antenna extends in a direction crossing the first surface of the first substrate.

(3) In the above aspect (1), the light-emitting elements are arranged radially at predetermined intervals in a circumferential direction on the first surface of the first substrate.

(4) In the above aspect (2), the light-emitting elements are arranged in a plurality of rows.

(5) In the above aspect (1), a space is formed around the antenna for air to escape from the second surface side to the first surface side of the first substrate in a state where the antenna is inserted and positioned in the opening.

(6) In any one of the above aspects (1) to (5), the first substrate is covered with a metal panel except for light-emitting portions of the light-emitting elements and a hole for a connection portion to the second substrate.

(7) In any one of the above aspects (1) to (6), the light further comprises a heat shield arranged between the first substrate and the second substrate.

(8) In any one of the above aspects (1) to (7), the communication unit includes a communication module, and the communication module is located on a surface of the second substrate that does not face the first substrate.

(9) In any one of the above aspects (1) to (8), the light further comprises a power supply circuit, wherein all or part of the power supply circuit is mounted on the first substrate and/or the second substrate.

(10) In the above aspect (9), the light further comprises a third substrate, wherein the third substrate is located at a predetermined distance from the second substrate, and all or part of the power supply circuit is mounted on the first substrate, the second substrate, and/or the third substrate.

(11) In the above aspect (10), the light further comprises a connector that connects the second substrate and the third substrate.

(12) In any one of the above aspects (1) to (11), the second substrate is loaded with a program that performs the steps of receiving dimming settings managed by a server and controlling the dimming.

(13) In any one of the above aspects (1) to (12), the light is an incandescent lamp or a fluorescent lamp.

(14) A system comprises: the light according to any one of the above aspects (1) to (13); and a server, wherein the second substrate sends a lighting status to the server, and the server notifies a user of the lighting status according to rules defined based on the lighting status.

Effects of the Invention

According to the present disclosure, it is possible to provide a light that offers information about the operation of turning the light on/off.

MODES FOR CARRYING OUT THE INVENTION

Figure 1:
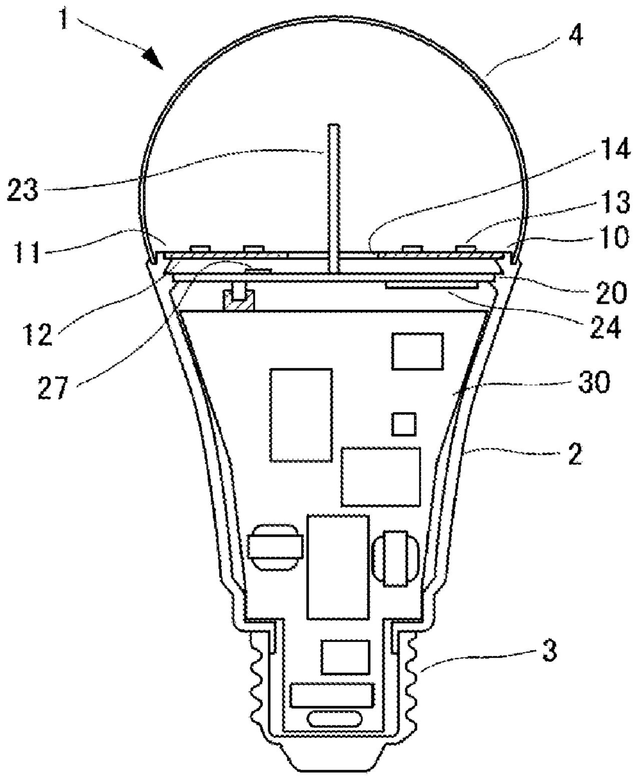
FIG. 1 is a schematic diagram illustrating a light according to a first embodiment of the present invention.

In the following, exemplary embodiments will be described in detail with reference to the accompanying drawings. Note that like parts are designated by like reference numerals or characters throughout the description of the embodiments.

First Embodiment

FIG. 1 is a schematic diagram illustrating a light 1 according to an embodiment of the present invention. In the example of FIG. 1, the light 1 is illustrated as an incandescent lamp (bulb-type lamp) and includes a housing 2, a cap 3 at the lower end of the housing 2, and a cover 4.

The housing 2 is preferably made of a metal with good thermal conductivity such as, for example, aluminum. This allows the housing 2 to function as a heat sink with heat dissipation properties.

The cap 3 preferably has a standard size such as E17 or E26 so that it can be fitted to a standard socket.

The cover 4 is preferably made of glass or the like with good translucency. A scattering agent may be applied to the inner surface of the cover 4 according to the direction in which the light is desired to be irradiated.

The light 1 further includes therein a first substrate 10, a second substrate 20, and a third substrate 30. The substrate structure need not necessarily have three substrates as illustrated in FIG. 1, and there may be one or more substrates. For example, the first substrate 10 and the second substrate 20 may be composed of a single substrate. The first substrate 10 and the second substrate 20 may also be composed of three or more substrates. In addition, the substrate structure may not include the third substrate 30.

The first substrate 10 has a first surface 11 facing the cover 4, on which a plurality of light-emitting elements 13 are arranged at predetermined intervals. The first substrate 10 also has a second surface 12 opposite to the first surface 11 and an opening 14. The opening 14 is located near the center and connects the first surface 11 and the second surface 12.

The second substrate 20 is located facing the second surface 12 of the first substrate 10. The second substrate 20 has a communication unit 24 mounted thereon and is provided with an antenna 23. The antenna 23 is arranged to extend through the opening 14 of the first substrate 10 in a direction crossing the first surface 11 of the first substrate 10.

As illustrated in FIG. 1, the first substrate 10 and the second substrate 20 may be installed so as to be supported by the housing 2. In this way, the heat of the first substrate 10 and the second substrate 20 can be efficiently radiated to the outside through the housing 2.

In response to an on/off operation, the communication unit 24 transmits information about the on/off operation to an external destination. In other words, information about the operation of turning the light 1 on and off is transmitted to an external destination since the light-emitting elements 13 are turned on and off by the on/off operation.

Figure 2:
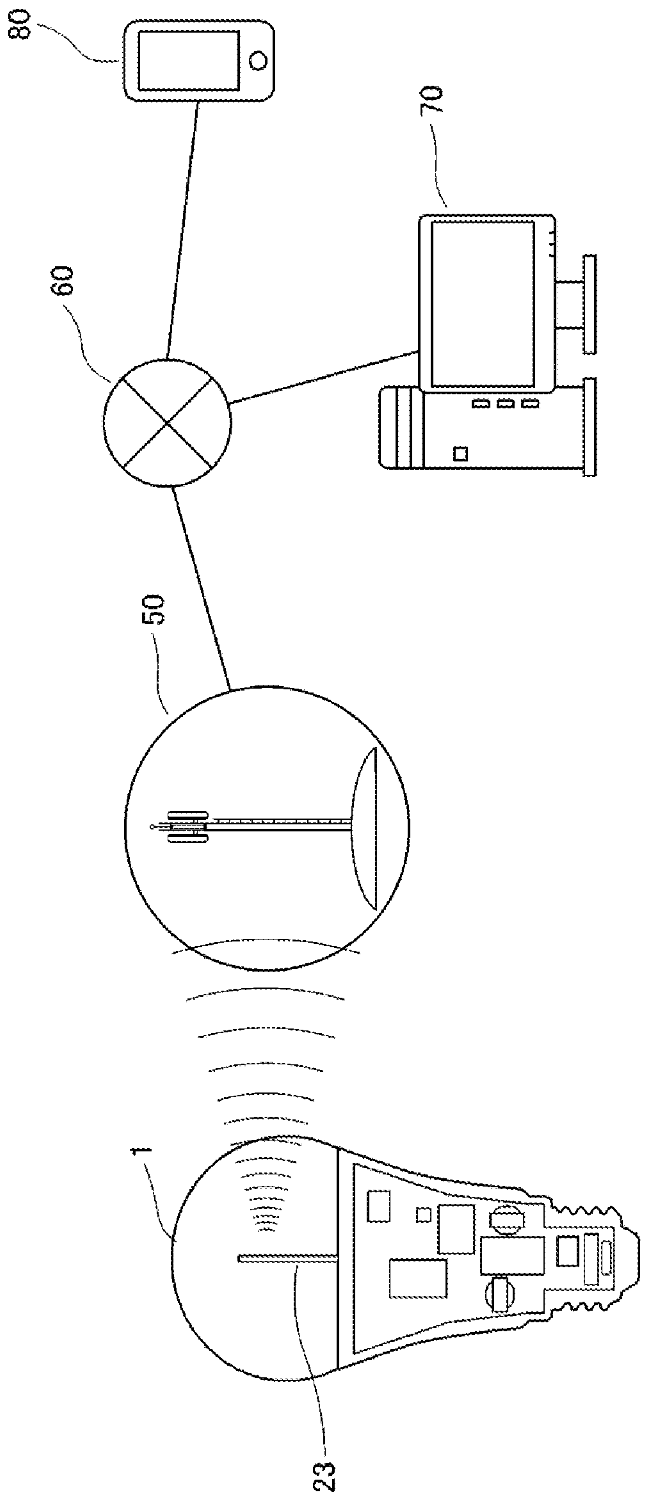
FIG. 2 is a schematic diagram illustrating communication using the light according to the first embodiment of the present invention.

FIG. 2 is a schematic diagram illustrating communication using the light 1 according to the embodiment of the present invention. The light 1 has the antenna 23 which transmits and receives radio waves. Thus, the light 1 is configured to be able to communicate with the outside. As illustrated in FIG. 1, the light 1 has a subscriber identity module (SIM) 27. This allows the light 1 to perform mobile data communications (2G, 3G, LTE, etc.) via a base station 50, as illustrated in FIG. 2.

The base station 50 receives the radio waves transmitted from the antenna 23. The radio waves received at the base station 50 are converted into signals and transmitted to a network 60. The signals are then sent through the network 60 to a server 70. The light 1 is configured to communicate with the server 70 in this manner.

An information signal transmitted from the server 70 is sent through the network 60 to the base station 50, where the signal is converted to radio waves. The radio waves are radiated and received by the antenna 23 of the light 1. Thus, the light 1 and the server 70 are capable of one-way and two-way communication.

A user terminal 80 may be connected to the network 60 so that the light 1, the server 70, and the user terminal 80 can communicate with one another via the network 60. The user terminal 80 is an information terminal such as a personal computer or a smartphone.

Figure 3:
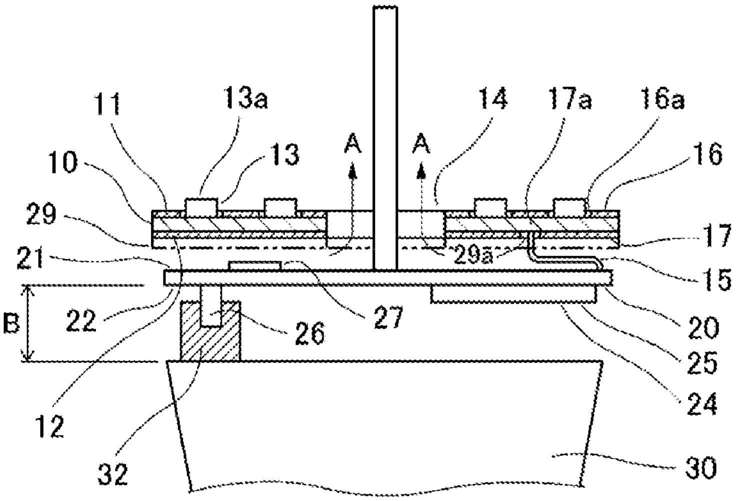
FIG. 3 is a diagram illustrating an example of the substrate structure of the light according to the first embodiment of the present invention.

FIG. 3 is a diagram illustrating an example of the substrate structure of the light 1 according to the embodiment of the present invention. The first substrate 10 and the second substrate 20 are connected by a connection portion 15. As a result, the first substrate 10 and the second substrate 20 are electrically connected, which enables the supply of power and the transmission and reception of control signals. The connection portion 15 may include a cable, or it may connect the substrates only with a connector without a cable.

The light-emitting elements 13 are arranged at predetermined intervals on the first surface 11 of the first substrate 10. The first substrate 10 is covered with metal panels 16 and 17 except for light-emitting portions 13*a* of the light-emitting elements 13 and a hole 17*a* for the connection portion 15 to the second substrate 20. The metal panel 16 covers the first surface 11 of the first substrate 10, while the metal panel 17 covers the second surface 12 of the first substrate 10. The metal panel 16 has holes 16*a* each corresponding to one of the light-emitting portions 13*a* of the light-emitting elements 13.

Each of the light-emitting elements 13 is an electronic component that converts an electrical signal into an optical signal. For example, the light-emitting element 13 may be a chip LED in which an LED element is placed on a small substrate, connected to an electrode, and coated with resin. In this case, the LED element serves as the light-emitting portion 13*a*. The light-emitting element 13 need not necessarily be a chip LED and may also be, for example, a laser diode or the like.

The metal panels 16 and 17 are each preferably made of a metal with good thermal conductivity such as aluminum. This allows the heat generated in the light-emitting elements 13 to be efficiently dissipated.

The metal panels 16 and 17 may be connected by a metal member (not illustrated) for heat transfer. The metal panels 16 and 17 may also be configured to be in contact with the housing 2. In this way, heat is transferred from the first substrate 10 to the housing 2 through the metal panels 16 and 17 and can be cooled more efficiently by the outside air.

The light 1 may include a heat shield 29 arranged between the first substrate 10 and the second substrate 20. This prevents the heat generated in the light-emitting elements 13 from being transferred to the second substrate 20 side. The heat shield 29 may be provided with a hole 29*a* for the connection portion 15 to pass through. In addition, the heat shield 29 may be attached to the panel 17.

The communication unit 24 includes a communication module 25. As illustrated in FIG. 3, the communication module 25 is located on a surface of the second substrate 20 that does not face the first substrate 10. In other words, in the example of FIG. 3, the communication unit 24 is located on a back surface 22 of the second substrate 20. This makes the communication module 25 less susceptible to the heat generated by the light-emitting elements 13.

The communication module 25 acquires information about the turning on/off of the light 1. The communication module 25 generates a signal superimposed with the information and sends it to the antenna 23. The antenna 23 transmits the signal as radio waves. As illustrated in FIG. 3, the SIM 27 is placed on a front surface 21 of the second substrate 20. This enables mobile data communications (2G, 3G, LTE, etc.) via the base station 50, as illustrated in FIG. 2.

Referring to FIG. 3, in a state where the antenna 23 is inserted and positioned in the opening 14, a space is formed around the antenna 23 for the air to escape from the second surface 12 side to the first surface 11 side of the first substrate 10. The opening 14 is provided through the first substrate 10, the metal panels 16 and 17, and the heat shield 29. The antenna 23 is arranged in a state of being inserted in the opening 14, and there is a space of the opening 14 around it. As a result, the air flows from the second surface 12 side of the first substrate 10 as indicated by arrows A, and the heat around the first substrate 10 and the second substrate 20 can be effectively dissipated.

The light 1 is provided with a power supply circuit. All or part of the power supply circuit may be mounted on the first substrate 10 and/or the second substrate 20. Specifically, the power supply circuit may be mounted entirely on the first substrate 10, may be mounted entirely on the second substrate 20, or may be divided to be mounted on the first substrate 10 and the second substrate 20. Power is supplied from the outside through the cap 3 via a socket.

When the light 1 includes the third substrate 30, all or part of the power supply circuit may be mounted on the first substrate 10, the second substrate 20, and/or the third substrate 30. Specifically, the power supply circuit may be mounted entirely on the first substrate 10, may be mounted entirely on the second substrate 20, may be mounted entirely on the third substrate 30, or may be divided to be mounted on two or three of the first substrate 10, the second substrate 20, and the third substrate 30.

By optimally mounting the power supply circuit on the first substrate 10, the second substrate 20, and/or the third substrate 30 in this manner, space efficiency can be achieved, and the size of the light 1 can be reduced.

FIG. 3 illustrates a case where the light 1 is provided with the third substrate 30 on which the power supply circuit is mounted and which is located at a predetermined distance B from the second substrate 20. In the light 1, the power supply circuit is a heat source as with the light-emitting elements 13. Accordingly, the third substrate 30 is placed at a predetermined distance B from the second substrate 20 to reduce the influence of the heat generated by the power supply circuit on the communication module 25.

As illustrated in FIG. 3, the second substrate 20 and the third substrate 30 are provided with connectors 26 and 32 that electrically connect them to each other. More specifically, the second substrate 20 has the connector 26, and the third substrate 30 has the connector 32. One of the connectors 26 and 32 fits to the other to electrically connect the substrates. In this manner, the substrates are connected directly via the connectors 26 and 32 without a cable, which makes it possible to reduce the size of the light 1.

As illustrated in FIG. 3, the first substrate 10 is covered with the metal panels 16 and 17. On the other hand, the second substrate 20 or the third substrate 30 may not be covered with a panel. This is because the second substrate 20 and the third substrate 30 do not need to have heat-generating sources arranged over a large area unlike the first substrate 10 having the light-emitting elements 13.

Figure 4:
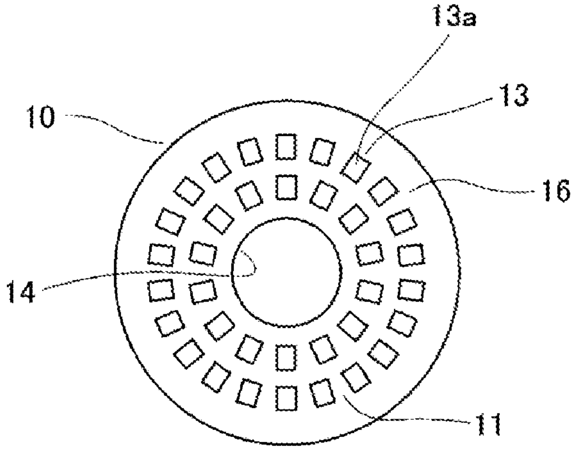
FIG. 4 is a diagram illustrating an example of the arrangement of light-emitting elements of the light according to the first embodiment of the present invention.

FIG. 4 is a diagram illustrating an example of the arrangement of the light-emitting elements 13 of the light 1 according to the embodiment of the present invention. The light-emitting elements 13 are arranged radially at predetermined intervals in the circumferential direction on the first surface 11 of the first substrate 10. When the light 1 is used for the purpose of irradiating the light uniformly in the irradiation direction, the light-emitting elements 13 may be arranged uniformly at predetermined intervals in the circumferential direction.

In addition, the light-emitting elements 13 may be arranged in a single row, or they may also be arranged in a plurality of rows. The number of rows to be arranged may be determined according to the size of the light 1, the area to be irradiated, the intensity of the light to be irradiated, and the like. Although FIG. 4 illustrates an example in which the light-emitting elements 13 are arranged in two rows, the number of rows is not limited to two, and they may be arranged in three or more rows.

In the example of FIG. 4, the light-emitting elements 13 are arranged on the circumference of circles; however, their arrangement is not so limited, and they may be arranged on the vertices or sides of polygons such as hexagons and octagons. The arrangement of the light-emitting elements 13 is appropriately selected according to the shape of the light 1 and the purpose of use.

As illustrated in FIG. 4, the first surface 11 of the first substrate 10 is covered with the metal panel 16 except for the light-emitting portions 13*a* of the light-emitting elements 13. The opening 14 is located around the center.

Figure 5:
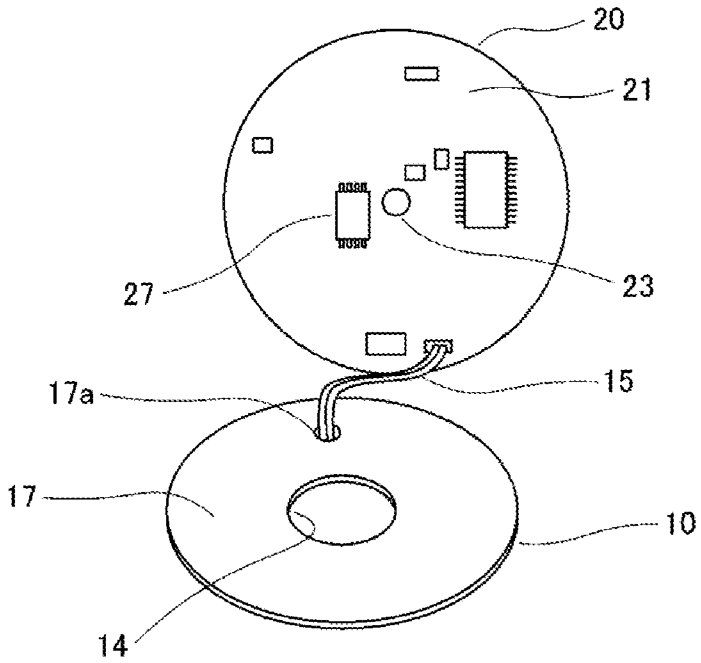
FIG. 5 is a schematic diagram illustrating a second substrate of the light according to the first embodiment of the present invention.
Figure 6:
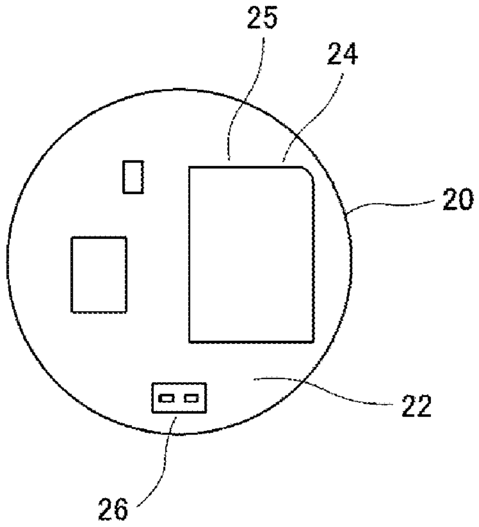
FIG. 6 is a schematic diagram illustrating the second substrate of the light according to the first embodiment of the present invention.

FIGS. 5 and 6 are schematic diagrams illustrating the second substrate 20 of the light 1 according to the embodiment of the present invention. FIG. 5 illustrates the front surface 21 of the second substrate 20, and FIG. 6 illustrates the back surface 22 of the second substrate 20.

Referring to FIG. 5, the antenna 23 is located near the center of the front surface 21 of the second substrate 20, and the SIM 27 is located outside thereof.

The second surface 12 of the first substrate 10 and the front surface 21 of the second substrate 20 are electrically connected by the connection portion 15. The second surface 12 of the first substrate 10 is covered with the metal panel 17 except for the hole 17*a* for the connection portion 15.

Referring to FIG. 6, the communication module 25 of the communication unit 24 and the connector 26 connected to the third substrate 30 are arranged on the back surface 22 of the second substrate 20.

Figure 7:
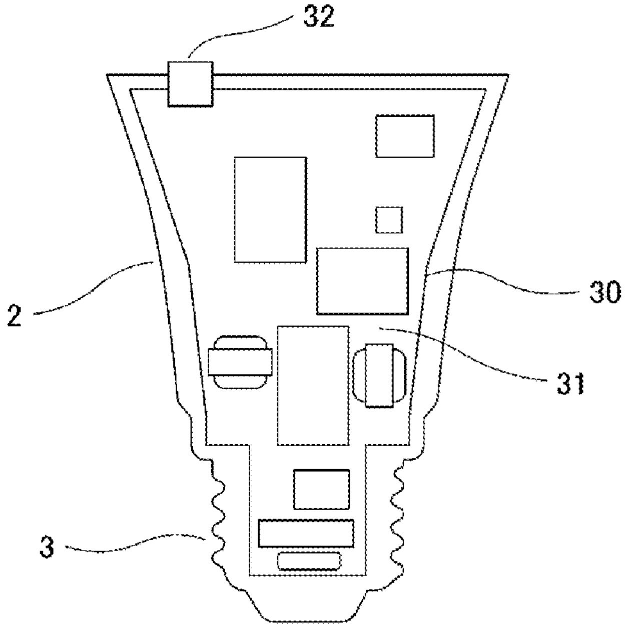
FIG. 7 is a schematic diagram illustrating a third substrate of the light according to the first embodiment of the present invention.

FIG. 7 is a schematic diagram illustrating the third substrate 30 of the light 1 according to the embodiment of the present invention. The third substrate 30 is mounted so as to be enclosed in the housing 2. When the housing 2 is made of a conductive material such as metal, a case made of an insulating material (not illustrated) may be interposed between the third substrate 30 and the housing 2 in order to ensure safety in use.

The third substrate 30 has a power supply circuit 31 arranged thereon. The power supply circuit 31 is an element that serves as a heat source similarly to the light-emitting elements 13. The heat generated in the semiconductor components or the like of the power supply circuit 31 is transferred to the housing 2 by heat transfer and efficiently dissipated to the outside by radiation, especially when the housing 2 is made of a metal with good thermal conductivity such as aluminum.

The third substrate 30 is provided with the connector 32 which is electrically connected to the connector 26 of the second substrate 20.

The second substrate 20 may check and acquire the strength of the radio waves received from the antenna 23. In this case, the second substrate 20 may be able to retry transmission when the strength of the radio waves is weak so that reliable communication can be performed.

The light 1 may be configured to transmit and receive radio waves to and from devices equipped with short-range communication capabilities, such as Bluetooth (registered trademark), located within a radius of 10 to 100 meters using the 2.4 GHz frequency band. In other words, the light 1 may have a receiving means (receiver) for short-range communication such as Bluetooth and also a transmitting means (transmitter). In this way, the brightness of the light 1 can be controlled and various settings can be made from a smartphone or a device equipped with short-range communication capabilities, such as Bluetooth, without going through the base station 50, the network 60, and the server 70. This also allows the light 1 to send information about its on/off state to a smartphone, a dedicated device equipped with short-range communication capabilities, or the like, without going through the base station 50, the network 60, and the server 70.

In addition, the light 1 may be able to acquire its serial number and transmit it to an external destination. Specifically, a table of the correspondence between the serial number of the light 1 and the number of the SIM 27 may be prepared to allow the light 1 to acquire its serial number based on the number of the SIM 27 held as data by the SIM 27. The light 1 may be configured to transmit the number of the SIM 27 to an external destination. By preparing a database of the serial number and installation location of the light 1 in advance, it is possible to obtain the radio field strength and the serial number of the light 1 or the number of the SIM 27 to determine the installation location of the relevant light 1 and the radio field strength at that installation location. This allows appropriate action to be taken if the radio field strength is insufficient. For example, an indoor antenna is installed in the installation location, the installation location is changed, or the light 1 is repaired or replaced.

In addition to the radio field strength and the serial number, the light 1 may also acquire and transmit the temperature inside the light bulb, the continuous lighting time, the past lighting time, and the like. More specifically, the light 1 may include a unit configured to measure and acquire the temperature inside the light bulb (inside the light 1), a unit configured to measure and acquire the date, time, and time period when the light 1 is turned on and off, a unit configured to store the temperature and time data obtained by these units, and a unit configured to transmit the data. The unit that transmits the data may be the communication unit 24, the antenna 23, or a short-range communication transmitter such as a Bluetooth transmitter. In this way, the operating status of the light 1 can be determined and provided in more detail, and the operating status data can be used for various purposes.

For example, an analysis may be performed as follows: 30 minutes have passed since the light was turned on; the temperature inside the light bulb is normal at 68° C.; the radio field strength is weak at −107 dbm; the previous lighting time was 35 minutes; and the light bulb is functioning properly but there is a risk that the lighting will not be detected. An action can then be taken to address the weak radio field strength.

Similarly, the light 1 can be replaced if the following analysis is made: 5 hours have passed since the light was turned on; the temperature inside the light bulb is 32.6° C.; the radio field strength is good at −70 dbm; the previous lighting time was 305 minutes; the LED light may be faulty due to the low temperature inside the light bulb; and the light bulb needs to be replaced. In this manner, the operating status data can be used to check the failure of the light 1.

For another example, it is possible to detect that the user of the light 1 may be under some kind of unusual conditions as a result of an analysis as follows: immediately after the light is turned on; the temperature inside the light bulb is 0° C., and the room temperature is estimated to be 0° C. or below freezing; the radio field strength is good (79 dmb); the previous lighting time was 228 minutes; the user may be under such conditions as air conditioning failure, power saving, or using the light outdoors, and if the light is used for safety checks, action is required. Thus, appropriate action can be taken. In this manner, the operating status data can be used to check the safety of the user.

The second substrate 20 may be loaded with a program that performs the steps of receiving the dimming settings managed by the server 70 illustrated in FIG. 1 and controlling the dimming. For this purpose, the second substrate 20 may include a memory that stores the program and the received dimming settings and a microprocessor that executes the program using the dimming settings. The memory may be a semiconductor memory such as a read-only memory (ROM), a random-access memory (RAM), or a flash memory.

The dimming settings of the light 1 are made in the server 70 and transmitted to the light 1, which receives the dimming settings and stores them in the memory. The microprocessor executes the program based on the stored dimming settings to control the dimming of the light 1 based on the dimming settings. This provides the same effect as controlling the dimming of the light 1 from the server 70 at a remote location and enables the appropriate dimming of the light 1 according to the installation location, time, season, weather, and the like. Examples of dimming objects may include turning on/off of the light 1, illuminance to adjust the brightness of the light emitted by the light 1, and toning to adjust the color of the light.

For example, when used in an unmanned store, the light 1 is set to be on while the store is open and off while the store is closed. In addition, during the opening hours of the store, the lighting level is set to be low in the daytime and high at night. The settings can be changed according to the season. For example, in summer, the daytime setting is made longer and the nighttime setting is made shorter; in winter, the daytime setting is made shorter and the nighttime setting is made longer; and in spring and autumn, the settings are in the middle of them. The settings may be changed depending on the location of the unmanned store. If the store is located inside a building, the daytime and nighttime settings are made such that there is little difference between them because the store is not affected by sunlight. On the other hand, if the store is located outdoors, the daytime and nighttime settings are made such that there is a large difference between them because the store is affected by sunlight.

The color of the light emitted by the light 1 may also be set. That is, toning may be performed. For example, the light is dimmed to cool colors (bluish light, white light) to create coolness in summer and dimmed to warm colors (reddish light) to create warmth in winter.

The program stored in the memory of the second substrate 20 may contain dimming settings for the light 1 according to the environment of the installation location. More specifically, the light 1 may obtain data on the environment of the location where it is installed, and the microprocessor may also use the data when executing the program to control the dimming of the light 1 based on the stored dimming settings. The data on the environment of the installation location includes, for example, brightness and temperature. The data may be used to turn the light 1 on or off, to adjust the brightness of the light emitted by the light 1, and to perform toning to adjust the color of the light.

The light 1 may be configured to send information about its lighting up to the server 70. In this case, the server 70 sends dimming settings back to the light 1 in response to the information. Upon receipt of the dimming settings, the light 1 controls the dimming thereof based on the settings. When the light 1 is set to periodically send the lighting information to the server 70, the server 70 can periodically send the dimming settings to the light 1.

The light 1 may be used to constitute a system, i.e., a system comprising the light 1 and the server 70, wherein the second substrate 20 sends the lighting status to the server 70, and the server 70 notifies the user terminal 80 used by a user of the lighting status according to rules defined based on the lighting status.

In this way, a user in a remote location can obtain information on the lighting status of the light 1, i.e., whether the light is on or off, the duration of the lighting status, and the like.

For example, it is assumed that a rule is set in advance such that when information about the lighting of the light 1 is acquired at a predetermined time such as at night, the information about the lighting is sent from the server 70 to the user terminal 80. In this case, the server 70 sends information indicating that the light 1 has been turned on at the predetermined time to the user terminal 80. This information allows the user to know that the light 1, which is normally off at night in an unoccupied location, has been turned on and to detect an abnormality, such as a suspicious person entering the location. The user can then take appropriate action. In this manner, the light 1 can be used for crime prevention.

If the light 1 is equipped with a human sensor, when a person enters an area being monitored, the human sensor detects it, and the light 1 can be turned on based on the detection information. In this case, the light 1 may send the lighting information to the server 70, and the server 70 may send the lighting information to the user terminal 80 based on a preset rule so that the user can be notified of the lighting of the light 1. In this manner, the light 1 can be used for remote monitoring.

For another example, it is assumed that a rule is set in advance such that when the light 1 installed in the toilet is not turned on for a predetermined period of time, the server 70 sends lighting information to the user terminal 80. In this case, the server 70 sends information indicating that the light 1 in the toilet has not been turned on for the predetermined period of time to the user terminal 80. This information allows the user to know that the light 1 in the toilet, which is supposed to be used on a daily basis, has not been turned on for the predetermined period of time and to detect the possibility that an abnormality has occurred in the occupant of the house. The user can then take appropriate action. In this manner, the light 1 can be used for safety checks.

Although the light 1 is illustrated as an incandescent lamp (bulb-type lamp) in FIG. 1, it is not so limited and may be any other type of lighting device, including incandescent lamps and fluorescent lamps.

In addition, the cross-sectional shape of the light 1 is not limited to circular. For example, the light 1 may have a polygonal cross-section, such as a square or a hexagon, or it may have an elliptical cross-section. Furthermore, the shape of the first substrate 10, the second substrate 20, and the panels 16 and 17 is not limited to circular, but their shape may be polygonal, such as a square or a hexagon, or elliptical.

Second Embodiment

Figure 8:
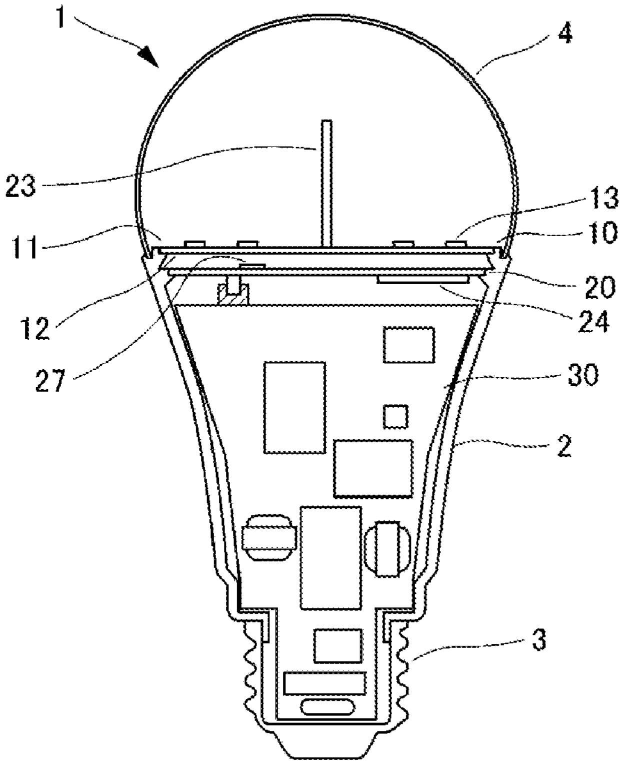
FIG. 8 is a schematic diagram illustrating a light according to a second embodiment of the present invention.
Figure 9:
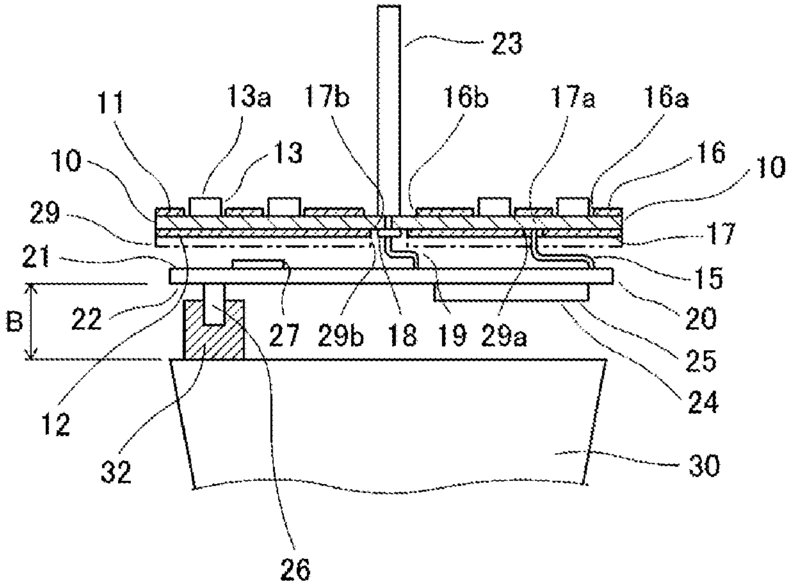
FIG. 9 is a diagram illustrating an example of the substrate structure of the light according to the second embodiment of the present invention.

FIG. 8 is a schematic diagram illustrating the light 1 according to a second embodiment of the present invention. FIG. 9 is a diagram illustrating an example of the substrate structure of the light 1 according to the second embodiment of the present invention. The light 1 of the second embodiment will be described with reference to FIGS. 8 and 9. Only the aspects in which the light 1 of the second embodiment differs from that of the first embodiment will be described below.

As illustrated in FIG. 8, in the light 1 of the second embodiment, the antenna 23 is located on the first substrate 10, which is different from the light 1 of the first embodiment in which the antenna 23 is located on the second substrate 20.

Referring to FIG. 9, the antenna 23 is arranged on the first surface 11 of the first substrate 10, and the panel 16 covering the first surface 11 of the first substrate 10 is provided with a hole 16*b* for the antenna 23 to pass through. The antenna 23 extends in a direction crossing the first surface 11 of the first substrate 10.

The first substrate 10 has an antenna terminal 18 electrically connected to the antenna 23 on the second surface 12. The antenna terminal 18 and the second substrate 20 are electrically connected by an antenna connection portion 19. This allows communication signals to be transmitted between the antenna 23 located on the first substrate 10 and the communication module 25 of the communication unit 24 located on the second substrate 20. Thus, in response to an on/off operation, the communication unit 24 can transmit information about the on/off operation to an external destination.

The antenna connection portion 19 may include a cable, or it may connect the antenna terminal 18 and the second substrate 20 only by a connector without a cable. The antenna 23 and the second substrate 20 may also be electrically connected by the connection portion 15 without separately providing the antenna connection portion 19. In this case, the connection portion 15 may include a cable, or it may connect the antenna terminal 18 and the second substrate 20 only by a connector without a cable.

For passing the antenna connection portion 19 therethrough, the panel 17 covering the second surface 12 of the first substrate 10 is provided with a hole 17*b*, and the heat shield 29 is provided with a hole 29*b*. In addition, a hole may be provided around the antenna 23 to allow the air to pass through.

As specifically described above, according to the embodiments of the present invention, it is possible to provide a system and a light that provide information about the operation of turning the light on/off.

Although specific embodiments of the invention have been described and illustrated, it is to be understood that the invention is not to be limited to the embodiments disclosed herein, but is susceptible to various changes and modifications.

Indeed, the invention is not limited to any particular embodiment and, as will be apparent to those skilled in the art, various changes, modifications, and alterations may be made within the scope of the invention as defined by the appended claims.

LIST OF REFERENCE SIGNS

1 Light
2 Housing
3 Cap
4 Cover
10 First substrate
11 First surface
12 Second surface
13 Light-emitting element
14 Opening
15 Connection portion
16 Panel
16*a* Hole
16*b* Hole
17 Panel
17*a* Hole
17*b* Hole
18 Antenna terminal
19 Antenna connection portion
20 Second substrate
21 Front surface
22 Back surface
23 Antenna
24 Communication unit
25 Communication module
26 Connector
27 SIM
29 Heat shield
29*a* Hole
29*b* Hole
30 Third substrate
31 Power supply circuit
32 Connector
50 Base station
60 Network
70 Server
80 User terminal

The invention claimed is:

1. A light comprising:
a plurality of light-emitting elements;
a first substrate having a first surface on which the light-emitting elements are arranged at predetermined intervals, a second surface, and an opening that connects the first surface and the second surface;
a second substrate located facing the second surface of the first substrate and having a communication unit mounted thereon;
a metal panel that covers the first substrate except for light-emitting portions of the light-emitting elements and a hole for a connection portion to the second substrate; and
an antenna arranged on the second substrate, wherein
in response to an on/off operation, the communication unit transmits information about the on/off operation to an external destination, and
the antenna extends through the opening of the first substrate in a direction crossing the first surface of the first substrate.

2. The light according to claim 1, wherein the light-emitting elements are arranged radially at predetermined intervals in a circumferential direction on the first surface of the first substrate.

3. The light according to claim 1, wherein a space is formed around the antenna for air to escape from the second surface side to the first surface side of the first substrate in a state where the antenna is inserted and positioned in the opening.

4. The light according to claim 1, further comprising a heat shield arranged between the first substrate and the second substrate.

5. The light according to claim 1, wherein
the communication unit includes a communication module, and
the communication module is located on a surface of the second substrate that does not face the first substrate.

6. The light according to claim 1, further comprising a power supply circuit, wherein all or part of the power supply circuit is mounted on the first substrate and/or the second substrate.

7. The light according to claim 6, further comprising a third substrate, wherein
the third substrate is located at a predetermined distance from the second substrate, and
all or part of the power supply circuit is mounted on the first substrate, the second substrate, and/or the third substrate.

8. The light according to claim 7, further comprising a connector that connects the second substrate and the third substrate.

9. The light according to claim 1, wherein the second substrate is loaded with a program that performs the steps of receiving dimming settings managed by a server and controlling dimming.

10. The light according to claim 1, wherein the light is an incandescent lamp or a fluorescent lamp.

11. A system comprising:

the light according to claim 1; and a server, wherein the second substrate sends a lighting status to the server, and the server notifies a user of the lighting status according to rules defined based on the lighting status.

12. A light comprising:

a plurality of light-emitting elements;

a first substrate having a first surface on which the light-emitting elements are arranged at predetermined intervals and a second surface opposite to the first surface;

a second substrate located facing the second surface of the first substrate and having a communication unit mounted thereon;

a metal panel that covers the first substrate except for light-emitting portions of the light-emitting elements and a hole for a connection portion to the second substrate; and an antenna arranged on the first surface of the first substrate, wherein in response to an on/off operation, the communication unit transmits information about the on/off operation to an external destination, and the antenna extends in a direction crossing the first surface of the first substrate.

13. The light according to claim 12, wherein the light-emitting elements are arranged in a plurality of rows.

14. The light according to claim 12, further comprising a heat shield arranged between the first substrate and the second substrate.

15. The light according to claim 12, wherein the communication unit includes a communication module, and the communication module is located on a surface of the second substrate that does not face the first substrate.

16. The light according to claim 12, further comprising a power supply circuit, wherein all or part of the power supply circuit is mounted on the first substrate and/or the second substrate.

17. The light according to claim 16, further comprising a third substrate, wherein the third substrate is located at a predetermined distance from the second substrate, and all or part of the power supply circuit is mounted on the first substrate, the second substrate, and/or the third substrate.

18. The light according to claim 17, further comprising a connector that connects the second substrate and the third substrate.

19. The light according to claim 12, wherein the second substrate is loaded with a program that performs the steps of receiving dimming settings managed by a server and controlling dimming.

20. The light according to claim 12, wherein the light is an incandescent lamp or a fluorescent lamp.

* * * * *